(12) United States Patent
Pirhonen et al.

(10) Patent No.: US 7,235,613 B2
(45) Date of Patent: Jun. 26, 2007

(54) METHOD OF GLUING WOOD BASED MATERIALS

(75) Inventors: Salme Pirhonen, Sollentuna (SE); Benyahia Nasli-Bakir, Saltsjö-Boo (SE); Ingvar Lindh, Bromma (SE)

(73) Assignee: Akzo Nobel N.V., Arnhem (NL)

( * ) Notice: Subject to any disclaimer, the term of this patent is extended or adjusted under 35 U.S.C. 154(b) by 194 days.

(21) Appl. No.: 10/272,938

(22) Filed: Oct. 18, 2002

(65) Prior Publication Data

US 2003/0079833 A1 May 1, 2003

(51) Int. Cl.
  *C08L 61/10* (2006.01)
  *C08L 61/12* (2006.01)
  *C08L 61/28* (2006.01)
(52) U.S. Cl. .................... 525/495; 525/408
(58) Field of Classification Search ............... None
  See application file for complete search history.

(56) References Cited

U.S. PATENT DOCUMENTS

| | | | | |
|---|---|---|---|---|
| 4,935,457 A | * | 6/1990 | Metzner et al. | 524/14 |
| 5,674,338 A | | 10/1997 | Parker | 156/98 |
| 5,756,599 A | | 5/1998 | Teodorczyk | 525/491 |
| 6,734,275 B2 | * | 5/2004 | Pirhonen et al. | 528/129 |

FOREIGN PATENT DOCUMENTS

| EP | 0277106 | | 8/1988 |
|---|---|---|---|
| EP | 277106 A1 | * | 8/1988 |
| EP | 0538687 A1 | | 10/1992 |
| EP | 538687 A1 | * | 4/1993 |
| EP | 924280 A1 | * | 6/1999 |
| JP | 37-000089 B | | 1/1962 |
| JP | 50146629 A | * | 11/1975 |
| JP | 57074376 A | * | 5/1982 |
| JP | 58222173 A | * | 12/1983 |
| JP | 60-23410 A | * | 2/1985 |
| JP | 60-028479 | | 2/1985 |
| JP | 6-200226 A | | 12/1992 |
| JP | 70025792 | | 8/1993 |
| JP | 09-087604 | | 3/1997 |
| JP | 2001279213 A | * | 10/2001 |
| SE | 505134 | | 6/1997 |
| SU | 275280 | | 10/1970 |
| SU | 939516 B | * | 6/1982 |

OTHER PUBLICATIONS

CAPLUS accession No. 1988:551599 for Polish Patent No. 131,522, Oltuszewski, Nov. 30, 1984, abstract.*
CAPLUS accession No. 1994:193444 for Kehr et al., Holz als Roh- und Werkstoff (1993), vol. 51, No. 3, abstract.*
Wikipedia, "Ammonium chloride," www.wikipedia.org, 2006, one page.*
Caplus accession No. 1971:4203 for Soviet Union Patent No. 275,280; Ponomareva, Jul. 3, 1970, one page.*
Derwent accession No. 1971-34236S for Soviet Union Patent No. 275,280; Ponomareva, Jul. 3, 1970, one page.*
M. Prestifilippo et al, "Low addition of melamine salts for improved UF adhesives water resistance"; Holz als Roh und Werkstoff 54 (1996), pp. 393-398.
Derwent English language abstract of SE 505134, Jun. 30, 1997.
English language version of Laid Open No. 1997-278855, Laid Open Date: Oct. 28, 1997 (Application No. 1996-121092, filed Apr. 17, 1996).
English language version of Laid Open No. 1977-51430, Laid Open Date: Apr. 25, 1977 (Application No. 1975-127479, filed Oct. 24, 1975), Apr. 25, 1977.
English language abstract of J52051430; XP-002187543, Apr. 25, 1977.
English language Abstract of EP 0538687, Oct. 9, 1992.
English language claims of EP 0538687 B1, Oct. 9, 1992.

* cited by examiner

*Primary Examiner*—Robert Sellers
(74) *Attorney, Agent, or Firm*—WRB-IP LLP

(57) ABSTRACT

The present invention relates to a method of gluing wood based materials by providing an adhesive system onto wood based materials followed by curing, the adhesive system comprises a melaminic amino resin and a phenolic resin composition, wherein the phenolic resin composition comprises an acid and a phenolic resin. The invention also relates to an adhesive system and a stable phenolic resin composition as well as wood based products obtained by the method or through the use of the adhesive system.

9 Claims, No Drawings

METHOD OF GLUING WOOD BASED MATERIALS

The present invention relates to a method of gluing wood based materials whereby an adhesive system comprising a melaminic amino resin and a phenolic resin composition comprising an acid and a phenolic resin are provided onto wood based materials and cured. The present invention also relates to an adhesive system and a stable phenolic resin composition. Furthermore, it also relates to a wood based product obtainable by the method. Finally, it relates to the use of an adhesive system for making a wood based product.

BACKGROUND

When gluing wood, it is common to use an adhesive system based on a curable resin, such as a formaldehyde resin, which, for example, can be an amino resin or a phenolic resin. Important properties of an adhesive include adhesive strength, curing time and temperature, water-resistance and emission of formaldehyde.

High water-resistance is especially required for some glued wooden products, such as laminated beams, plywood, and other products for outdoor use. Melaminic amino resin adhesives, and also phenolic resin based adhesives, are commonly used when high water-resistance is required. The advantages of using amino resin based adhesives over phenolic resin based ones are, for example, a much less coloured bondline and less environmental impacts since some phenolic resins need paraformaldehyde to cure.

Melaminic amino resins are condensates of carbonyl compounds, such as aldehydes, with melamine, or a combination of melamine with other compounds containing amino, imino or amide groups. The most common melaminic amino resins are condensates of formaldehyde and melamine alone, or melamine and urea giving melamine-formaldehyde ("MF") and melamine-urea-formaldehyde ("MUF"). A MUF resin can also be made by mixing an MF resin and a UF resin. Melaminic amino resins are usually cured by using acidic hardener compositions.

Emission of free aldehyde, particularly formaldehyde, from adhesives based on melamine based resins and phenolic based resins is a growing concern. Formaldehyde is to various extent present in formaldehyde based melaminic amino resins as free formaldehyde but also further emitted from the resins during curing. This gives environmental problems, both before curing during handling and application of the resin, and emission problems from the finished products after curing. Phenolic resins may also emit formaldehyde during curing and during handling of the resin.

JP Laid Open No. 1977-51430, discloses an adhesive composition for manufacturing plywood comprising a melamine resin and a resol-type phenolic resin. However, there is nothing mentioned about any reduction of formaldehyde emission.

Aldehyde emission from an adhesive system can be reduced by using various additives which act as catchers for the aldehyde. However, such additives do not generally themselves possess any adhesive properties. Thus, the quality of the adhesive bond may be negatively effected. Furthermore, these additives may take part in unwanted reactions with other components of the adhesive system, and addition of such additives also often creates a more complex formulation procedure.

Thus, it is desirable to provide a method of gluing wood based materials, and an adhesive system, which gives low emission of aldehyde, and high quality adhesive bonds.

Therefore, it is an object of the present invention to provide a method for gluing wood based materials which gives low emission of aldehyde. It is another object of the present invention to provide an adhesive system, as well as a phenolic resin composition intended for use in an adhesive system, which gives low emission of aldehyde. Finally, it is an object of the present invention to provide a wood based product which gives low emission of aldehyde.

THE INVENTION

It has surprisingly been found possible to meet these objects by a new method of gluing wood based materials using a new adhesive system and a new stable phenolic resin composition. The method according to the invention comprises gluing wood based materials by providing an adhesive system onto wood based materials followed by curing, the adhesive system comprising a melaminic amino resin and a phenolic resin composition, wherein the phenolic resin composition comprises an acid and a phenolic resin, which is a resorcinol resin or a tannin resin, or a mixture thereof. The adhesive system according to the invention comprises a melaminic amino resin, and a phenolic resin composition, wherein the phenolic resin composition comprises an acid and a phenolic resin, which is a resorcinol resin or a tannin resin, or a mixture thereof. The stable phenolic resin composition according to the invention comprises an acid and a phenolic resin, which is a resorcinol resin or a tannin resin, or a mixture thereof. The invention further relates to a wood based product obtainable by the method which can be a flooring material, plywood, a laminated beam and a fibre-, chip- or particleboard material. Finally, the invention relates to the use of an adhesive system for making a wood based product which can be a flooring material, plywood, a laminated beam and a fibre-, chip- or particle board material.

The present invention provides a phenolic resin composition which is storage stable before mixing with a curable resin.

By the term "adhesive system", as used herein, is meant a curing formulation containing one or more curable resins and one or more curing agents.

By the term "melaminic amino resin", as used herein, is meant an amino resin where melamine is at least one of the raw materials used when making the resin.

The combination of a melaminic amino resin with a phenolic resin composition according to the invention makes it possible to provide an adhesive system with low emission of formaldehyde.

A further advantage with the present invention is that melaminic amino resins, having very low contents of free formaldehyde, can be used in order to achieve adhesive bonds with high quality.

The melaminic amino resin used in the method and the adhesive system of the invention can be any melaminic amino resin, such as melamine-formaldehyde ("MF"), melamine-urea-formaldehyde ("MUF"), melamine-urea-phenol-formaldehyde ("MUPF"), and condensates of formaldehyde and melamine together with any other compounds containing amino, imino or amide groups such as thiourea, substituted urea, and guanamines. The preferred melaminic amino resin is MF. The melaminic amino resin can also be an etherified resin. The "aldehyde to amino compound ratio", which is the molar ratio aldehyde to amino compound used when making the amino resin of the claimed adhesive system, is suitably less than 2.4, preferably from about 0.5 to about 2.3, most preferably from about 0.7 to about 2. The amount melamine of total amount amino compounds used when making the amino resin is suitably from about 10 to 100 mole %, preferably from about 30 to about 100 mole %, most preferably from about 50 to about 100 mole %. Optionally, fillers, thickeners or other additives, including aldehyde catchers, can be added to the amino resin. Examples of fillers are inorganic fillers such as kaolin and calcium carbonate or organic fillers such as wood flour, wheat flour, starch and gluten. Examples of thickeners are polyvinyl alcohol, and cellulose compounds such as hydroxy ethyl cellulose and carboxy methyl cellulose. Other additives can be, for example, polyols, polysaccharides, polyvinylalcohol, acrylates, and styrene-butadiene polymers. Homopolymers or copolymers of vinylesters may also be used as components, such as vinyl acetate, vinyl propionate, and vinyl butyrate. These polymers may also comprise post-crosslinking groups. Also aldehyde catchers such as urea and guanamines may be added. If components, like fillers or other additives, according to above, are present, their amount can usually be less than about 70 weight %, suitably from about 0.1 to about 70 weight %, preferably from about 1 to about 60 weight %, most preferably from about 5 to about 40 weight %.

Condensates of different phenolic compounds and aldehydes are referred to as phenolic resins. The phenolic compound can be phenol itself, polyhydric phenols, and aliphatically or aromatically substituted phenols. Examples of phenolic compounds are alkyl phenols such as resorcinol, alkyl resorcinol, cresols, ethyl phenol and xylenol, and also phenolic compounds of natural origin such as tannins, cardenol, and cardol. Examples of suitable aldehydes include formaldehyde, acetaldehyde, glutaraldehyde, propionaldehyde, n-butyraldehyde, isobutyraldehyde and furfural. As phenolic resins are herein also included tannins themselves, without having formed condensates with aldehydes. Examples of tannins are condensed tannins, such as bi-, tri, and tetraflavanoids, and further condensed flavanoids. The phenolic resin in the present invention is a resorcinol resin or a tannin resin, or a mixture thereof. The phenolic resin can exist as a solution in water, or alcohol such as ethanol. Tannins can also be present as solid materials. Suitably, the phenolic resin exists as an aqueous solution with varying dry content of resin. Suitably, the phenolic resin is a formaldehyde-based phenolic resin. Preferred formaldehyde based phenolic resins in the phenolic resin composition are resorcinol-formaldehyde ("RF"), phenol-resorcinol-formaldehyde ("PRF"), and tannin-formaldehyde ("TF") resins. The most preferred being PRF. In the case of RF and PRF resins, the molar ratio of formaldehyde to total amount phenolic compounds (one or both of phenol and resorcinol) in the PRF resin, calculated as added when making the resins, can be from about 0.1 to about 2, suitably from about 0.2 to about 1.5, preferably from about 0.3 to about 1. The molar ratio phenol to resorcinol in the PRF resin, calculated as added when making the PRF resin, can be from about 0.02 to about 15, suitably from about 0.05 to about 10, preferably from about 0.1 to about 5, most preferably from about 0.2 to about 2. Alternatively, the PRF resin can be a substantially PF resin, containing substantially no resorcinol, of a resol type having resorcinol grafted onto it as terminal groups.

Examples of suitable acids include organic and inorganic protonic acids, acidic salts, and acid generating salts. As acid is also meant metal salts giving acidic reaction in aqueous solutions, also referred to herein as non-protonic acids. Examples of suitable non-protonic acids include aluminium chloride, aluminium nitrate and aluminium sulphate. Suitable organic protonic acids include aliphatic or aromatic mono-, di-, tri-, or polycarboxylic acids such as formic acid, acetic acid, maleic acid, malonic acid and citric acid. Also sulphonic acids such as para-toluene sulphonic acid, para-phenol sulphonic acid and benzene sulphonic acid are suitable. Inorganic protonic acids can be, for example, hydrochloric acid, sulphuric acid, nitric acid, phosphoric acid, boric acid, sulphamic acid and ammonium salts such as ammonium chloride and ammonium sulphate. Examples of acid generating salts are formiates and acetates such as sodium formiate, sodium acetate, ammonium formiate, and ammonium acetate. A strong acid such as hydrochloric acid or sulphuric acid may be combined with an alkyl amine in the phenolic resin composition thereby forming an alkyl amine salt. The phenolic resin composition may comprise more than one acid, for example, two, three or several acids. Also, the phenolic resin composition may comprise a combination of both an organic acid and an inorganic acid. Suitably, the acid is soluble in the phenolic resin, and solutions of the phenolic resin. In some cases, one or more additives, which improve the solubility of the acid in the phenolic resin, are suitably used. Such additives can be polyglycols such as polyethylene glycol, polypropylene glycol, ketones such as acetone, and dialkyl ethers such as ethylene glycol monobutyl ether, diethylene glycol monobutyl ether, propylene glycol monomethyl ether, diethylene glycol monomethyl ether, and, dipropylene glycol monomethyl ether. Acids suitable in the phenolic resin composition depends partly on the type of structure to be glued. For example, applications such as gluing laminated beams benefits from the use of volatile acids, which evaporates off from the adhesive layer. By the term "volatile acid" is herein meant an acid having a low boiling point, and/or having a high vapour pressure at room temperature. Said acids should suitably have a vapour pressure of more than 10 mm Hg at a temperature of up to 60° C. Examples of organic volatile acids include formic acid, acetic acid and pyrovic acid. Suitable inorganic acids include, for example, hydrochloric acid. Preferably, formic acid is used as a volatile acid.

In a preferred embodiment of the invention, a combination of a MF resin with a phenolic resin composition comprising a PRF resin and formic acid, gives an adhesive system which gives low emission of formaldehyde.

The phenolic resin composition may, optionally, comprise fillers, thickeners or other additives. These can be inorganic fillers such as kaolin and calcium carbonate or organic fillers such as wood flour, wheat flour, starch and gluten. Examples of thickeners are polyvinyl alcohol, and cellulose compounds such as hydroxy ethyl cellulose and carboxy methyl cellulose. Other additives can be, for example, polyols, polysaccharides, polyvinylalcohol, acrylates, and styrene-butadiene polymers. Homopolymers or copolymers of vinylesters such as vinyl acetate, vinyl propionate, and vinyl butyrate, may also be used as additives, and also aldehyde catchers such as urea and guanamines.

The phenolic resin composition should preferably be storage stable meaning that substantially no curing of the phenolic resin should take place in the phenolic resin composition itself. An indicator for storage stability is the degree of gelling, either occurring evenly throughout the phenolic resin composition, or as lumps of gelled particles in the composition. Gelling throughout the composition gives an increased viscosity. The phenolic resin composition is considered storage stable if it has not gelled according to the above and if it functions in the application equipment used for applying the composition onto wood based materials. The stable phenolic resin composition according to the invention is suitably storage stable at room temperature (20° C.) for more than about two weeks, preferably more than about one month, most preferably more than about six months.

The content of phenolic resin in the phenolic resin composition can be from about 1 to about 80 weight %, based on dry matter, suitably from about 5 to about 70 weight %, preferably from about 10 to about 65 weight %, and most preferably from about 20 to about 60 weight %. The content of the acid in the phenolic resin composition depends on the original pH of the phenolic resin itself used in the phenolic resin composition. The content of the acid, including its salts, in the phenolic resin composition can be up to about 50 weight %, suitably from about 0.5 to about 50 weight %, preferably from about 1 to about 40 weight %, and most preferably from about 2 to about 30 weight %. If other components, like fillers or other additives, are present, their amount can usually be less than about 70 weight %, suitably from about 0.1 to about 70 weight %, preferably from about 1 to about 60 weight %, most preferably from about 5 to about 40 weight %. The pH of the phenolic resin composition is suitably from about 0 to about 6, preferably from about 0 to about 4, even more preferably from about 0.1 to about 3, most preferably from about 0.3 to about 2.

The pH of the adhesive system will effect the curing rate of the adhesive system and may be chosen thereafter. The pH of the adhesive system can be from about 0 to about 7, preferably from about 0 to about 5, and most preferably from about 0 to about 4.

Depending on the wood based materials to be glued as well as the way of providing the adhesive system onto the wood based materials, the preferred weight ratios of amino resin to phenolic resin may vary. The weight ratio amino resin to phenolic resin in the adhesive system can be from about 0.1:1 to about 30:1, based on dry matter, suitably from about 0.2:1 to about 10:1. In a preferred embodiment of the invention, the weight ratio amino resin to phenolic resin, based on dry matter, in the adhesive system is preferably from about 0.5:1 to about 2:1. Among suitable uses for this range is, for example, the production of a laminated beam. In another preferred embodiment of the invention, the weight ratio amino resin to phenolic resin, based on dry matter, in the adhesive system is preferably from about 2:1 to about 10:1. Among suitable uses for this range is, for example, the production of a flooring material.

The curing temperature, in the glue line, for the adhesive system of the present invention is suitably from about 0 to about 120° C. If no high frequency curing is used, the curing temperature is preferably from about 5 to about 80° C., most preferably from about 10 to about 40° C.

The wood based materials according to the method of the invention can be of any kind that can be joined by an adhesive system, including fibres, chips and particles. Suitably, the wood-based materials are layers in a flooring material such as parquet flooring, the layers in plywood, parts in laminated beams, or fibres, chips and particles for making fibre-, chip-, or particle board material. Preferably, the wood-based materials are parts in laminated beams.

In the method of the present invention, the adhesive system can be provided by separately applying the amino resin and the phenolic resin composition onto the wood based materials. Alternatively, the method of the invention can comprise mixing the amino resin and the phenolic resin composition to form the adhesive system and then providing the adhesive system onto the wood based materials.

Separate application include, for example, application of the amino resin onto one or several wood based materials and application of the phenolic resin composition onto one or several wood based materials onto which no amino resin have been previously applied. Thereafter, the wood based materials onto which only amino resin has been applied and the wood based materials onto which only phenolic resin composition has been applied are joined together providing a mixing of the two components forming an adhesive system which can be cured. Separate application also include, for example, application of the amino resin onto one or several wood based materials and application of the phenolic resin composition onto the same wood based materials. The amino resin and phenolic resin composition may be applied completely onto each other, partially onto each other, or without being in contact with each other. The surface of the wood based material with both amino resin and phenolic resin composition applied is thereafter joined with another surface of a wood based material, which also may have been applied with both amino resin and phenolic resin composition, thereby providing a good mixing of the amino resin and the phenolic resin composition forming an adhesive system which can be cured. Separate application of the amino resin and the phenolic resin composition can be made in any order onto the wood based materials to be glued.

Suitable amounts of the components to be applied can be in the range of 100–500 g/m² depending, inter alia, on the feeding rate of a moving substrate.

The application of the amino resin and phenolic resin composition, or the mixture of both, onto a wood based material can be made by using any suitable method known in the art, such as spraying, brushing, extruding, roll-spreading, curtain-coating etc. forming shapes such as droplets, one or several strands, beads or a substantially continuous layer.

In the case of gluing together wood materials in the form of fibres, chips or particles, the amino resin and the phenolic resin composition is suitably applied as a mixture which coats the wood based materials with the adhesive system.

The wood based product according to the invention is suitably a laminated beam, plywood, a fibre-, chip- or particle board, or a flooring material. Preferably, the wood based product is a laminated beam.

The invention will now further be described in connection with the following examples which, however, not should be interpreted as limiting the scope of the invention.

EXAMPLES

Example 1

Three different phenolic resin compositions were made: PRF resin and pTSA (the present invention), tannin and pTSA (the present invention), and PF resin and pTSA. The PRF resin had a dry content of 55 weight %. The tannin was of a type extracted from Quebracho wood and present as a solid powder. The PF resin was of a resol type, having a dry content of 47 weight %.

TABLE 1

| Phenolic resin composition | Phenolic resin content, wt % | pTSA content, wt % | Stability |
|---|---|---|---|
| PRF + pTSA | 48 | 6.4 | Excellent |
| tannin + pTSA | 36 | 22.7 | Excellent |
| PF + pTSA | 45 | 27.8 | Insufficient (<1 week) |

It is concluded that:
A PF resin of a resol type does not form a stable phenolic resin composition.
PRF and tannin resin form stable phenolic resin compositions.

Example 2

An MF resin was combined with a phenolic resin composition according to the present invention. The MF resin had a formaldehyde to melamine ratio of 2. The PRF resin had a dry content of 55 weight % and the molar ratio of formaldehyde to phenol and resorcinol when making the resin was 0.53. The weight ratio MF to PRF was 1.2. The stable phenolic resin composition according to the present invention comprised formic acid in an amount of 20 weight %. The adhesive system above was compared with single resin MF and PRF systems having conventional, i.e., acid based and paraformaldehyde based hardeners. Here, the MF resin had a formaldehyde to melamine ratio of 2, the PRF resin had a dry content of 55 weight %, and the molar ratio of formaldehyde to phenol and resorcinol when making the resin was 0.61. The emission of formaldehyde was measured as direct emission, during 150 minutes, from 5 g of a mixture (before curing) of the MF- and PRF resin with respective hardeners and the MF resin with the phenolic resin composition according to the invention.

Formaldehyde emission from glued structures was also tested according to an internal method (IAR 129) based on JAS MAFF992. For each adhesive system, five plies (150× 150 mm) of fir were glued together with 380 g/m² of a mixture of adhesive system components: MF with conventional acid hardener, PRF with conventional paraformaldehyde hardener, and MF resin with the phenolic resin composition according to the invention. The laminate was pressed at 0.8 MPa for 12 hours at 20° C. and subsequently conditioned at 20° C. at 65% relative humidity for one week. Pieces of 25×10×75 mm were cut out and put in a 4 liter chamber where also a small container with 20 ml of water was put. After 18 hours at 23° C. the content of formaldehyde in the water was measured.

TABLE 5

| | Direct formaldehyde emission (mg/l) | Formaldehyde emission (IAR 129, mg/l)) | Water resistance standard EN 301 |
|---|---|---|---|
| MF + (PRF + formic acid) | 0.06 | 4.9 | pass |
| MF + acid hardener | 0.33 | 5.8 | pass |
| PRF + paraformaldehyde hardener | 0.13 | 9.8 | pass |

It is concluded that the present invention gives lower emission of formaldehyde than when using an MF resin or a PRF resin alone with conventional hardeners.

The invention claimed is:

1. An adhesive system comprising a melaminic amino resin and a phenolic resin composition, wherein the phenolic resin composition comprises an acid which is a volatile acid, and a phenolic resin, which is a resorcinol-formaldehyde resin or a phenol-resorcinol-formaldehyde resin wherein the weight ratio of melaminic amino resin to phenolic resin is from about 0.2:1 to about 10:1, based on dry matter.

2. An adhesive system according to claim 1, wherein the amino resin is a melamine-formaldehyde resin.

3. An adhesive system according to claim 1, wherein the amino resin is a melamine-urea-formaldehyde resin.

4. An adhesive system according to claim 1, wherein the pH of the adhesive system is from about 0 to about 4.

5. An adhesive system according to claim 1, wherein the acid is selected from the group of formic acid, acetic acid and pyrovic acid.

6. An adhesive system according to claim 1, wherein the content of phenolic resin in the phenolic resin composition is from about 20 to about 60 weight %, based on dry matter.

7. An adhesive system according to claim 1, wherein the acid is formic acid.

8. An adhesive system according to claim, 1, wherein the acid is hydrochloric acid.

9. An adhesive system according to claim 1, wherein the weight ration amino resin to phenolic resin is from about 0.5 to about 2.

* * * * *